United States Patent
Parham, Jr. et al.

(10) Patent No.: US 10,843,788 B2
(45) Date of Patent: Nov. 24, 2020

(54) DAMPING STRUCTURES FOR TILTROTOR AIRCRAFT WINGS

(71) Applicant: Textron Innovations Inc., Providence, RI (US)

(72) Inventors: Thomas Clement Parham, Jr., Fort Worth, TX (US); Jeffrey Bosworth, Fort Worth, TX (US); Gary Miller, Fort Worth, TX (US); Frank Bradley Stamps, Fort Worth, TX (US); Jouyoung Jason Choi, Fort Worth, TX (US); Paul K. Oldroyd, Fort Worth, TX (US); Richard Erler Rauber, Fort Worth, TX (US); Michael Scott Seifert, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 408 days.

(21) Appl. No.: 15/638,345

(22) Filed: Jun. 29, 2017

(65) Prior Publication Data

US 2019/0002078 A1    Jan. 3, 2019

(51) Int. Cl.
| | |
|---|---|
| *B64C 3/26* | (2006.01) |
| *B64C 1/12* | (2006.01) |
| *B64C 3/20* | (2006.01) |
| *B64C 29/00* | (2006.01) |
| *B64D 27/06* | (2006.01) |

(52) U.S. Cl.
CPC .............. *B64C 3/26* (2013.01); *B64C 1/12* (2013.01); *B64C 3/20* (2013.01); *B64C 29/0033* (2013.01); *B64D 27/06* (2013.01)

(58) Field of Classification Search
CPC .... B64C 3/20; B64C 3/22; B64C 3/24; B64C 3/26; B64C 29/003; B64C 1/06; B64C 1/006; B64C 1/12
See application file for complete search history.

(56) References Cited

U.S. PATENT DOCUMENTS

| | | | | |
|---|---|---|---|---|
| 4,416,349 | A | * | 11/1983 | Jacobs ................... G10K 11/16 181/208 |
| 5,096,140 | A | * | 3/1992 | Dornier, Jr. et al. ......... B64C 29/0033 |
| 5,507,477 | A | * | 4/1996 | Manning ................. F16F 3/093 188/378 |

(Continued)

OTHER PUBLICATIONS

European Exam Report; Application No. 18167038.1; EPO; dated Oct. 5, 2018.

(Continued)

*Primary Examiner* — Magdalena Topolski
*Assistant Examiner* — Marisa V Conlon
(74) *Attorney, Agent, or Firm* — Lawrence Youst PLLC (57) ABSTRACT

A wing airframe for a wing of a tiltrotor aircraft includes a wing airframe core assembly and a wing skin assembly disposed on the wing airframe core assembly. The wing skin assembly includes an outer skin and a damping sublayer, the damping sublayer interposed between the outer skin and the wing airframe core assembly. The tiltrotor aircraft includes a pylon assembly subject to aeroelastic movement during forward flight. The wing is subject to deflection in response to the aeroelastic movement of the pylon assembly. The damping sublayer reduces the deflection of the wing, thereby stabilizing the wing during forward flight.

18 Claims, 7 Drawing Sheets

(56) References Cited

U.S. PATENT DOCUMENTS

| | | | |
|---|---|---|---|
| 6,776,371 B2* | 8/2004 | Tanaka | B64C 3/20 |
| | | | 156/182 |
| 7,578,468 B2* | 8/2009 | Drost | B64C 1/066 |
| | | | 181/290 |
| 7,861,967 B2* | 1/2011 | Karem | B64C 3/10 |
| | | | 244/12.4 |
| 8,662,442 B2 | 3/2014 | Stamps et al. | |
| 8,864,062 B2* | 10/2014 | Karem | B64C 29/0033 |
| | | | 244/12.4 |
| 9,511,571 B2* | 12/2016 | Montgomery | B29C 70/08 |
| 10,137,664 B2* | 11/2018 | Kashiwagi | B29C 70/202 |
| 2010/0129589 A1* | 5/2010 | Senibi | B32B 5/18 |
| | | | 428/71 |
| 2010/0270435 A1* | 10/2010 | Karem | B64C 29/0033 |
| | | | 244/7 R |
| 2012/0020801 A1 | 1/2012 | Zuardy et al. | |
| 2012/0051937 A1 | 3/2012 | Grase et al. | |
| 2017/0174313 A1* | 6/2017 | Brakes | B64C 3/187 |
| 2017/0259905 A1* | 9/2017 | Kooiman | B64C 3/26 |
| 2018/0043982 A1* | 2/2018 | Fink | B64C 1/061 |
| 2018/0257759 A1* | 9/2018 | Etling | B64C 9/14 |

OTHER PUBLICATIONS

European Search Report; Application No. 18167038.1; EPO; dated Sep. 14, 2018.

* cited by examiner

DAMPING STRUCTURES FOR TILTROTOR AIRCRAFT WINGS

TECHNICAL FIELD OF THE DISCLOSURE

The present disclosure relates, in general, to damping structures for use on wings of tiltrotor aircraft and, in particular, to wing skin assemblies having a damping sublayer to dampen wing deflections, including wing deflections resulting from the aeroelastic movement of propulsion assemblies.

BACKGROUND

Tiltrotor aircraft typically include multiple propulsion assemblies that are positioned near the outboard ends of a wing. Each propulsion assembly may include an engine and transmission that provide torque and rotational energy to a drive shaft that rotates a proprotor system including a hub assembly and a plurality of proprotor blades. Typically, a pylon assembly, which includes the proprotor system, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode.

Physical structures have natural frequencies of vibration that can be excited by forces applied thereto as a result of operating parameters and/or environmental conditions. These frequencies are determined, at least in part, by the materials and geometrical dimensions of the structures. In the case of tiltrotor aircraft, certain structures having critical natural frequencies include the fuselage, the wing and various elements of the propulsion assemblies. An important environmental condition experienced by tiltrotor aircraft is forward airspeed, which may induce proprotor aeroelastic instability, such as proprotor whirl flutter, which may couple to the wing of a tiltrotor aircraft. In the event of such coupling, the wing can become unstable, leading to excessive vibration, flutter or structural failure. To prevent such coupling, most wing airframes are designed to be stiff and light. For example, the wing of a conventional tiltrotor aircraft may include a torque box that is structurally suited to absorb wing deflections and help ensure wing stability. Nonetheless, it has been found that forward airspeed-induced proprotor aeroelastic instability is a limiting factor relating to the maximum airspeed of tiltrotor aircraft in forward flight mode. Accordingly, a need has arisen for wing damping systems and structures that increase the stability of tiltrotor aircraft wings at high speeds and in the presence of aeroelastic instability, thereby improving the overall performance and capabilities of the tiltrotor aircraft.

SUMMARY

In a first aspect, the present disclosure is directed to a wing airframe for a wing of a tiltrotor aircraft. The tiltrotor aircraft includes a pylon assembly subject to aeroelastic movement during forward flight. The wing airframe includes a wing airframe core assembly and a wing skin assembly disposed on the wing airframe core assembly. The wing skin assembly includes an outer skin and a damping sublayer, the damping sublayer interposed between the outer skin and the wing airframe core assembly. The wing is subject to deflection in response to the aeroelastic movement of the pylon assembly. The damping sublayer reduces the deflection of the wing, thereby stabilizing the wing during forward flight.

In some embodiments, the outer skin and the damping sublayer may be approximately coextensive and substantially parallel to one another. In certain embodiments, the wing skin assembly may include an inner skin interposed between the damping sublayer and the wing airframe core assembly such that the damping sublayer is sandwiched between the inner and outer skins. In some embodiments, the inner skin, the damping sublayer and the outer skin may be approximately coextensive and substantially parallel to one another. In certain embodiments, the damping sublayer may include an elastomeric material. In some embodiments, the elastomeric material may include a rubber compound having a loss tangent greater than natural rubber.

In certain embodiments, the wing may have a displacement amplitude in response to the deflection, and the damping sublayer may damp the deflection of the wing such that the displacement amplitude is reduced. In some embodiments, the deflection of the wing may include bending or torque movement. In certain embodiments, the damping sublayer may experience a shearing force in response to the deflection of the wing. In some embodiments, the wing may have a natural frequency and the deflection of the wing may include vibration at approximately the natural frequency in response to the aeroelastic movement of the pylon assembly. In certain embodiments, the deflection of the wing may include flutter. In some embodiments, the wing skin assembly may be disposed on either or both of the top side or the bottom side of the wing airframe core assembly. In certain embodiments, a portion of the wing skin assembly may be disposed on the bottom side of the wing airframe core assembly and form one or more access holes. In some embodiments, the wing airframe core assembly may include at least one spar and a plurality of ribs.

In a second aspect, the present disclosure is directed to a tiltrotor aircraft having a forward flight mode. The tiltrotor aircraft includes a fuselage and a wing coupled to the fuselage. The wing includes a torque box assembly having top and bottom sides and a wing skin assembly disposed on either or both of the top or bottom sides of the torque box assembly. The wing skin assembly includes an outer skin and a damping sublayer, the damping sublayer interposed between the outer skin and the torque box. The tiltrotor aircraft includes at least one propulsion assembly coupled to the wing, each propulsion assembly including a pylon assembly subject to aeroelastic movement during forward flight. The wing is subject to deflection in response to the aeroelastic movement of the pylon assembly. The damping sublayer reduces the deflection of the wing, thereby stabilizing the wing during forward flight.

In some embodiments, the torque box assembly may include a wing airframe core assembly having top and bottom sides and an inner skin disposed on the top and bottom sides of the wing airframe core assembly. In certain embodiments, the wing may include first and second outboard ends respectively having first and second propulsion assemblies coupled thereto and the wing may be subject to deflection in response to the aeroelastic movements of the pylon assemblies of the first and second propulsion assemblies. In some embodiments, the torque box assembly may have one or more load paths to transmit load in response to the deflection of the wing. In certain embodiments, the damping sublayer may be disposed substantially parallel to at least one of the load paths of the torque box assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A-1B and 2A-2F in the drawings, a tiltrotor aircraft is schematically illustrated and generally designated 10. Tiltrotor aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, supports, longerons, stringers, bulkheads, spars, ribs and skins such as wing spars 20, wing ribs 22 and wing skin assembly 24, may be considered to be the airframe of tiltrotor aircraft 10.

Figure 1A:
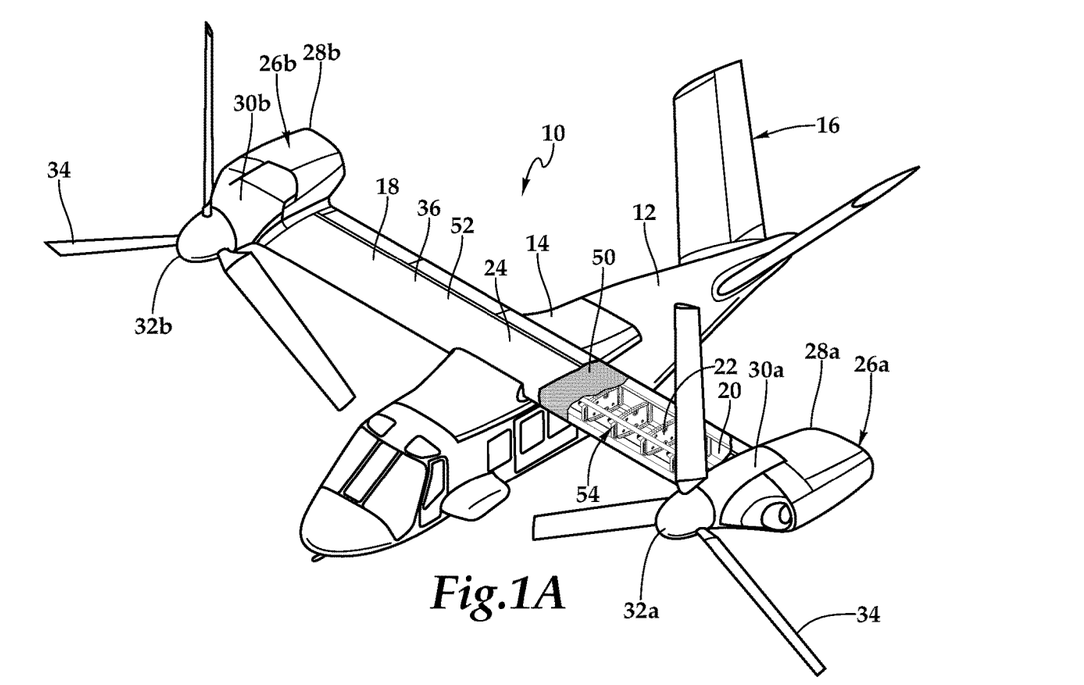
FIGS. 1A-1B are schematic illustrations of a tiltrotor aircraft having a damping sublayer in accordance with embodiments of the present disclosure.
Figure 1B:
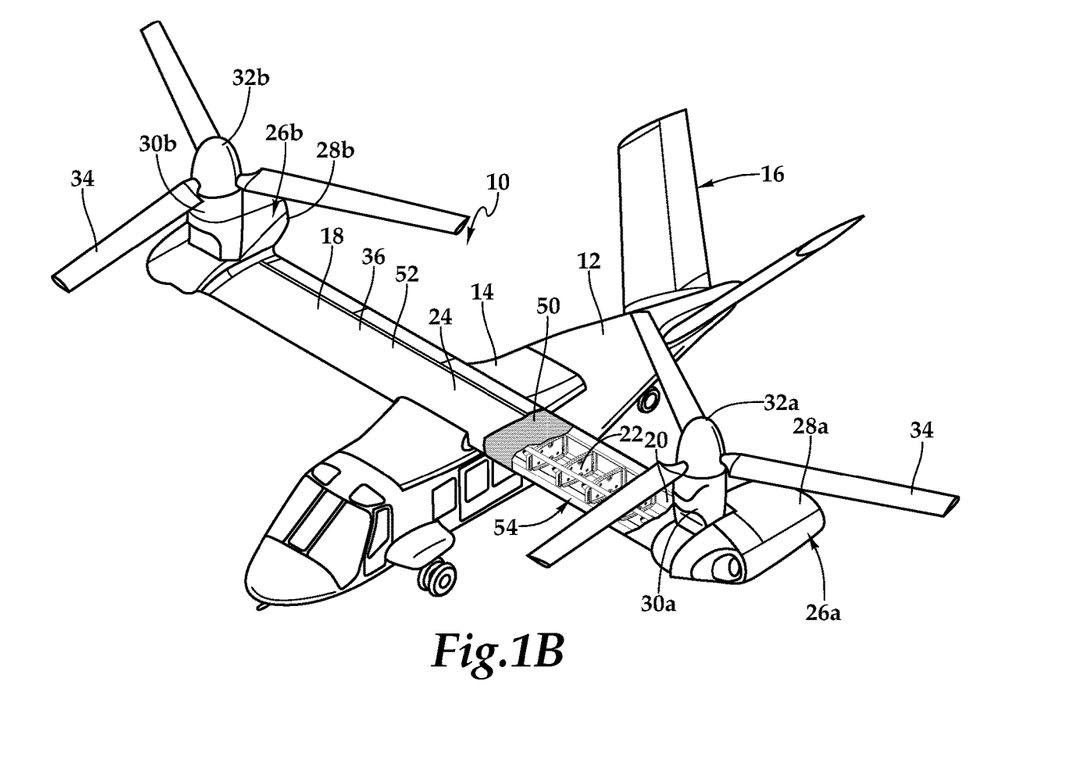

Coupled to the outboard ends of wing 18 are propulsion assemblies 26a, 26b. Propulsion assemblies 26a, 26b include fixed nacelles 28a, 28b, respectively, each of which preferably houses an engine and a fixed portion of a drive system. A pylon assembly 30a is rotatable relative to fixed nacelle 28a and wing 18 between a generally horizontal orientation, as best seen in FIG. 1A, and a generally vertical orientation, as best seen in FIG. 1B. Pylon assembly 30a includes a rotatable portion of the drive system and a proprotor system 32a that is rotatable responsive to torque and rotational energy provided via the engine and drive system. Likewise, a pylon assembly 30b is rotatable relative to fixed nacelle 28b and wing 18 between a generally horizontal orientation, as best seen in FIG. 1A, and a generally vertical orientation, as best seen in FIG. 1B. Pylon assembly 30b includes a rotatable portion of the drive system and a proprotor system 32b that is rotatable responsive to torque and rotational energy provided via the engine and drive system. In the illustrated embodiment, proprotor systems 32a, 32b each include three proprotor blade assemblies 34. It should be understood by those having ordinary skill in the art, however, that proprotor systems 32a, 32b could alternatively have a different number of proprotor blades, either less than or greater than three. In addition, it should be understood that the position of pylon assemblies 30a, 30b, the angular velocity or revolutions per minute (RPM) of proprotor systems 32a, 32b, the pitch of proprotor blades 34 and the like are controlled by the pilot of tiltrotor aircraft 10 and/or the flight control system to selectively control the direction, thrust and lift of tiltrotor aircraft 10 during flight. Wing 18 is supported by a wing airframe 36 including a torque box structure made up of wing spars 20, wing ribs 22 and other structural elements configured to distribute loads, shears and other motions generated by propulsion assemblies 26a, 26b during the various flight modes. As used herein, the term "coupled" may include direct or indirect coupling by any means, including moving and/or non-moving mechanical connections.

FIG. 1A illustrates tiltrotor aircraft 10 in a forward flight mode or airplane flight mode, in which proprotor systems 32a, 32b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 32a, 32b are positioned to rotate in a substantially horizontal plane to provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor systems 32a, 32b positioned between airplane flight mode and helicopter flight mode, which can be referred to as conversion flight mode.

Preferably, each fixed nacelle 28a, 28b houses a drive system, such as an engine and transmission, for supplying torque and rotational energy to a respective proprotor system 32a, 32b. In such embodiments, the drive systems of each fixed nacelle 28a, 28b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 32a, 32b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

Figures 2A, 2B, 2C, 2D:
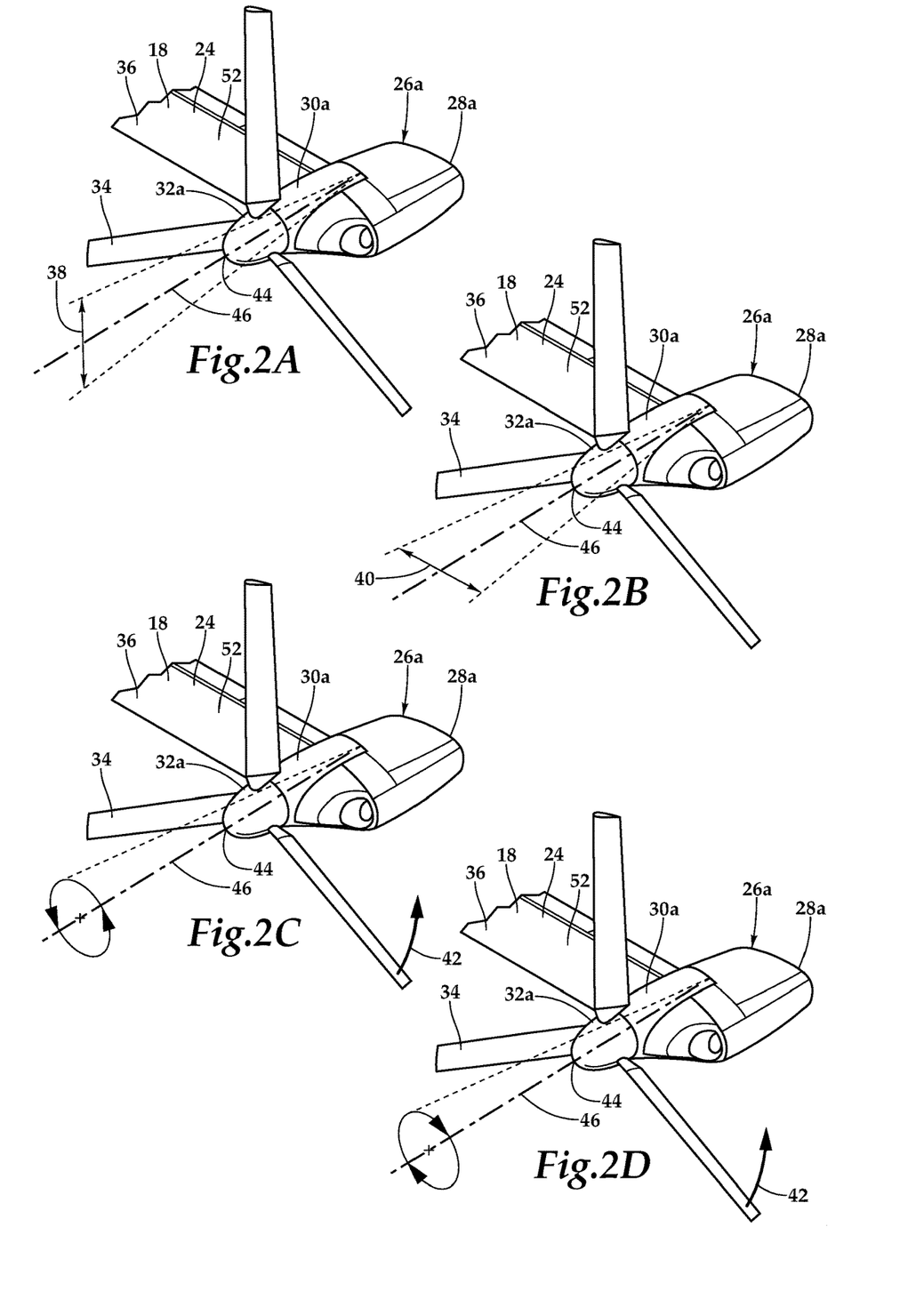
FIGS. 2A-2F are isometric views of a propulsion assembly subject to aeroelastic movement in accordance with embodiments of the present disclosure.
Figures 2E, 2F:
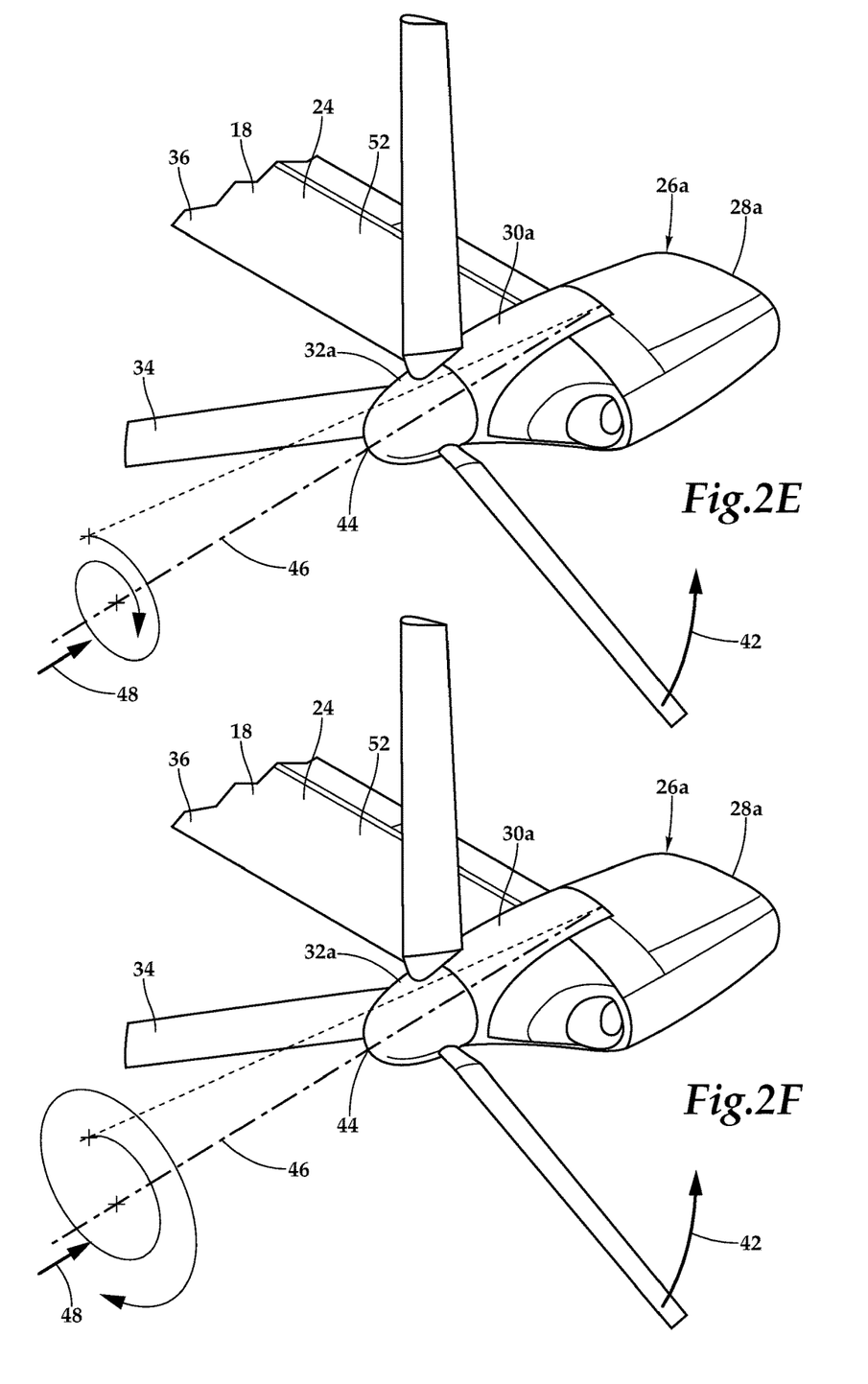

During high speed operations in airplane flight mode, the forward airspeed of tiltrotor aircraft 10 may induce proprotor aeroelastic movement or instability, such as propeller whirl flutter, that may couple to wing 18 and lead to failures. The aeroelastic movement of propulsion assemblies 26a, 26b, and of pylon assemblies 30a, 30b in particular, may be caused by aeroelastic phenomena, including dynamic aeroelastic phenomena, which involves interactions among inertial, aerodynamic and elastic forces, and/or static aeroelastic phenomena, which involve interactions between aerodynamic and elastic forces. The flexibility of modern aircraft is responsible, at least in part, for the various types of aeroelastic phenomena. Aeroelastic phenomena arise when structural deformations or movements in aircraft components induce additional aerodynamic forces. These additional aerodynamics forces may produce additional structural deformations or movements that induce still greater aerodynamic forces. Such interactions may tend to become smaller until a condition of stable equilibrium is reached, or they may tend to diverge, as shown in FIG. 2F, which can destroy the structure.

One example of aeroelastic movement is proprotor whirl flutter, a precession type instability that can occur on propulsion assemblies 26a, 26b, or a portion thereof, flexibly mounted on wing 18 while tiltrotor aircraft 10 experiences chordwise airflow during the forward flight mode illustrated in FIG. 1A. Proprotor whirl flutter may be caused by the interaction of a variety of factors, including high velocity airflow through proprotor systems 32a, 32b, the mount stiffness of fixed nacelles 28a, 28b, gyroscopic forces caused by proprotor systems 32a, 32b, aerodynamic forces, flapping of proprotor blades 34, in-flight disturbances, such as air gusts or wind buffets, and the natural flutter frequency of the wing structure. The influence of gyroscopic forces on the natural vibration modes of pylon assembly 30a is illustrated with the aid of FIGS. 2A-2F. When proprotor system 32a is not rotating, and aerodynamic and damping forces are neglected, natural vibrations of pylon assembly 30a can occur independently about either pitch axis 38 or yaw axis 40 as shown in FIGS. 2A and 2B, respectively.

When proprotor system 32a is rotating, however, the natural vibration modes are not excited independently, but are coupled by the gyroscopic action of the spinning proprotor system 32a, which is illustrated as rotating in a counterclockwise direction 42. The natural modes of pylon assembly 30a are then characterized by whirl or precession modes in reference to the manner in which proprotor nose 44 whirls or precesses about static thrust axis 46. These modes are so indicated in FIGS. 2C and 2D, in which aerodynamic and damping forces have been neglected. The natural whirl modes include a forward whirl mode, associated with a whirl of proprotor nose 44 in the direction of rotation 42 of proprotor system 32a as shown in FIG. 2C, and a backward whirl mode, associated with a whirl opposite to that of proprotor system 32a rotation as shown in FIG. 2D.

Since whirl modes produce angle-of-attack changes on proprotor blades 34, aerodynamic forces are generated that provide the mechanism for instability. Such instability for rigid-blade systems may occur in the backward whirl mode. When proprotor blades 34 have flap hinges or are very flexible, however, instability in the forward mode is possible. FIGS. 2E and 2F illustrate the manner in which pylon assembly 30a may respond in the backward whirl mode following a disturbance such as a gust. When airstream velocity 48 is less than the whirl flutter velocity $V_{crit}$, or Velocity Never Exceed (VNE), the path traced by proprotor nose 44 is a spiral that converges to the original static equilibrium position, as shown in FIG. 2E. When $V_{crit}$ is exceeded, however, a small disturbance will result in a diverging spiral motion of proprotor nose 44 which will continue to build up until the structure fails or its motion becomes limited by nonlinearities, as shown in FIG. 2F. In between these states, when airstream velocity 48 is approximately equal to $V_{crit}$, pylon assembly 30a is at a limit cycle in which the whirling mode neither grows nor decays.

Proprotor whirl flutter can cause deflection, including vibration, oscillation or flutter, of wing 18. For example, proprotor whirl flutter may cause structural shearing due to the tilting of the rotor disks in pylon assemblies 30a, 30b, which creates a moment and causes deflection of wing 18. Other types of aeroelastic phenomena that may induce deflection of wing 18 include buffeting, which is transient vibration of aircraft structural components due to aerodynamic impulses produced by the wake behind wing 18, fixed nacelles 28a, 28b, fuselage 12 or other components of tiltrotor aircraft 10; dynamic response, which is the transient response of aircraft structural components produced by rapidly applied loads due to gusts, landing, gun reactions, abrupt control motions, moving shock waves or other dynamic loads; load distribution, which is the influence of elastic deformations of the aircraft structure on the distribution of aerodynamic pressures over the aircraft; divergence, which is a static instability of a lifting surface of tiltrotor aircraft 10 in flight, at a speed called the divergence speed, at which the elasticity of the lifting surface plays an essential role in the instability; control effectiveness, which is the influence of elastic deformations of the aircraft structure on the controllability of tiltrotor aircraft 10; and/or control system reversal, a condition occurring in flight, at a speed called the control reversal speed, at which the intended effects of displacing a given component of the control system are nullified by elastic deformations of the aircraft structure.

The illustrative embodiments provide damping structures for stabilizing wing 18 when wing 18 is deflected, such as when wing 18 is deflected in response to the aeroelastic movements of pylon assemblies 30a, 30b. In the illustrated embodiment, a damping sublayer 50 is interposed between an outer skin 52 and a wing airframe core assembly 54, which includes wing spars 20 and wing ribs 22. Damping sublayer 50 may be formed from an elastomeric material, such as a rubber-based material, and outer skin 52 may be formed from a more rigid material, such as a composite material having numerous material plies composed of continuous filaments or fibers including one or more of glass, carbon, graphite, basalt, aromatic polyamide materials or the like and any combination thereof joined together with a resin such as a polymeric matrix. Outer skin 52 causes damping sublayer 50 to shear when wing 18 deflects. Damping sublayer 50 reduces the deflection of wing 18 caused by the aeroelastic movements of pylon assemblies 30a, 30b, thereby stabilizing wing 18 during forward flight. Wing 18 may also include other damping structures, such as distributed solid state shear dampers made from the same or similar elastomeric materials used by rotor system dampers.

Damping sublayer 50 may be useful in tiltrotor aircraft utilizing the principle of frequency separation to manage structural stability by reducing any potential or unforeseen vibratory responses of wing 18 in such tiltrotor aircraft. In tiltrotor aircraft utilizing frequency separation, wing 18 may be structured such that the natural frequency of wing 18 is separate, or sufficiently distant, from the excitation frequencies generated by proprotor systems 32a, 32b corresponding to 1/rev (1 per revolution), 2/rev, 3/rev, etc. As an example, if proprotor systems 32a, 32b have an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of proprotor systems 32a, 32b will result in a proportional change in the excitation frequencies generated by proprotor systems 32a, 32b. For tiltrotor aircraft, operating in airplane flight mode typically requires less thrust than operating in helicopter flight mode. One way to reduce thrust as well as increase endurance, reduce noise levels and reduce fuel consumption is to reduce the operating speed of proprotor systems 32a, 32b. For example, in helicopter flight mode, tiltrotor aircraft 10 may operate at 100 percent of design RPM, but in airplane flight mode, tiltrotor aircraft 10 may operate at a reduced percent of design RPM such as between about 80 percent and about 90 percent of design RPM. Thus, to achieve desirable rotor dynamics, the physical structure of tiltrotor aircraft 10, including wing 18, should be designed to avoid the frequencies of 1/rev, 2/rev, 3/rev, etc. for both helicopter flight mode and airplane flight mode operations.

Proprotor systems may be classified into two major categories: "stiff-in-plane" and "soft-in-plane." A stiff-in-plane proprotor system is used in tiltrotor aircraft in which the natural frequency of in-plane/lead-lag vibration of proprotor blades 34 is higher than both the proprotor system rotational frequency and the natural frequency of out-of-plane/flapping vibration of proprotor blades 34. A soft-in-plane proprotor system is used where the natural frequency of in-plane/lead-lag vibration of proprotor blades 34 is lower than both the proprotor system rotational frequency and the natural frequency of out-of-plane/flapping vibration of proprotor blades 34. It is well known that proprotor blades 34 and the associated proprotor system of a tiltrotor aircraft become more dynamically unstable as the natural frequencies of out-of-plane/flapping vibration of proprotor blades 34 and in-plane/lead-lag vibration of proprotor blades 34 converge toward equal values. Accordingly, it is not uncommon for tiltrotor aircraft to be designed such that the natural frequencies of out-of-plane/flapping vibration of proprotor blades 34 and in-plane/lead-lag vibration of proprotor blades 34 maintain a minimum separation of about 25% of the proprotor system rotational frequency.

The wing of a tiltrotor aircraft may be designed with high stiffness and light materials in an effort to increase the natural frequency of wing 18 to be sufficiently distant from the first-in-plane frequency of proprotor systems 32a, 32b. Tailoring the natural frequency of wing 18 in this manner relies on frequency separation to achieve proprotor whirl flutter mode stability in forward flight. This approach works well for aircraft with proprotor systems having first-in-plane frequencies above 1/rev, such as between 1/rev and 2/rev. For soft-in-plane proprotor systems, however, the principle of frequency separation may be less useful, requiring careful attention to RPM, stiffness and damping in proprotor systems 32a, 32b and wing 18 to maintain stability in forward flight. High stiffness is still desired for wing 18 and pylon assemblies 30a, 30b, but since deformations in the structure may exist in the fixed system, damping structures such as damping sublayer 50 can be added to wing 18 to increase the overall stability of tiltrotor aircraft 10.

It should be appreciated that tiltrotor aircraft 10 is merely illustrative of a variety of aircraft that can implement the embodiments disclosed herein. Indeed, wing damping structures such as damping sublayer 50 may be utilized on any aircraft having one or more wings. Other aircraft implementations can include hybrid aircraft, tiltwing aircraft, quad tiltrotor aircraft, unmanned aircraft, gyrocopters, airplanes, jets and the like. As such, those of ordinary skill in the art will recognize that wing damping structures such as damping sublayer 50 can be integrated into a variety of aircraft configurations. Although damping sublayer 50 is illustrated as being implemented on a unitary wing that spans both sides of fuselage 12, damping sublayer 50 may be utilized in two or more structurally separate or semi-separate wings of the same aircraft. It should be appreciated that even though aircraft are particularly well-suited to implement the embodiments of the present disclosure, non-aircraft vehicles and devices can also implement the embodiments, including, but not limited to, automobiles or land-based vehicles.

Referring to FIGS. 3A-3C and 4 in the drawings, wing airframe 100 supporting wing 102 of a tiltrotor aircraft is schematically illustrated. Wing 102 may be a unitary wing that is coupled to and straddles both sides of the tiltrotor aircraft fuselage, such as wing 18 in FIGS. 1A-1B. Outboard ends 104, 106 of wing 102 may each be coupled to a respective propulsion assembly (see FIGS. 1A-1B). In other implementations, a wing may extend from only one side of a fuselage such that an inboard end of the wing is coupled to the fuselage with the outboard end of the wing supporting a propulsion assembly. Wing airframe 100 has a wing airframe core assembly 110, which includes a forward spar 112 and an aft spar 114, and ribs 116 interposed between forward spar 112 and aft spar 114. Wing airframe core assembly 110 acts as a scaffold onto and into which additional aircraft components, such as skins, electrical components, fuel cells and the like, may be mounted or inserted.

Figure 3A:
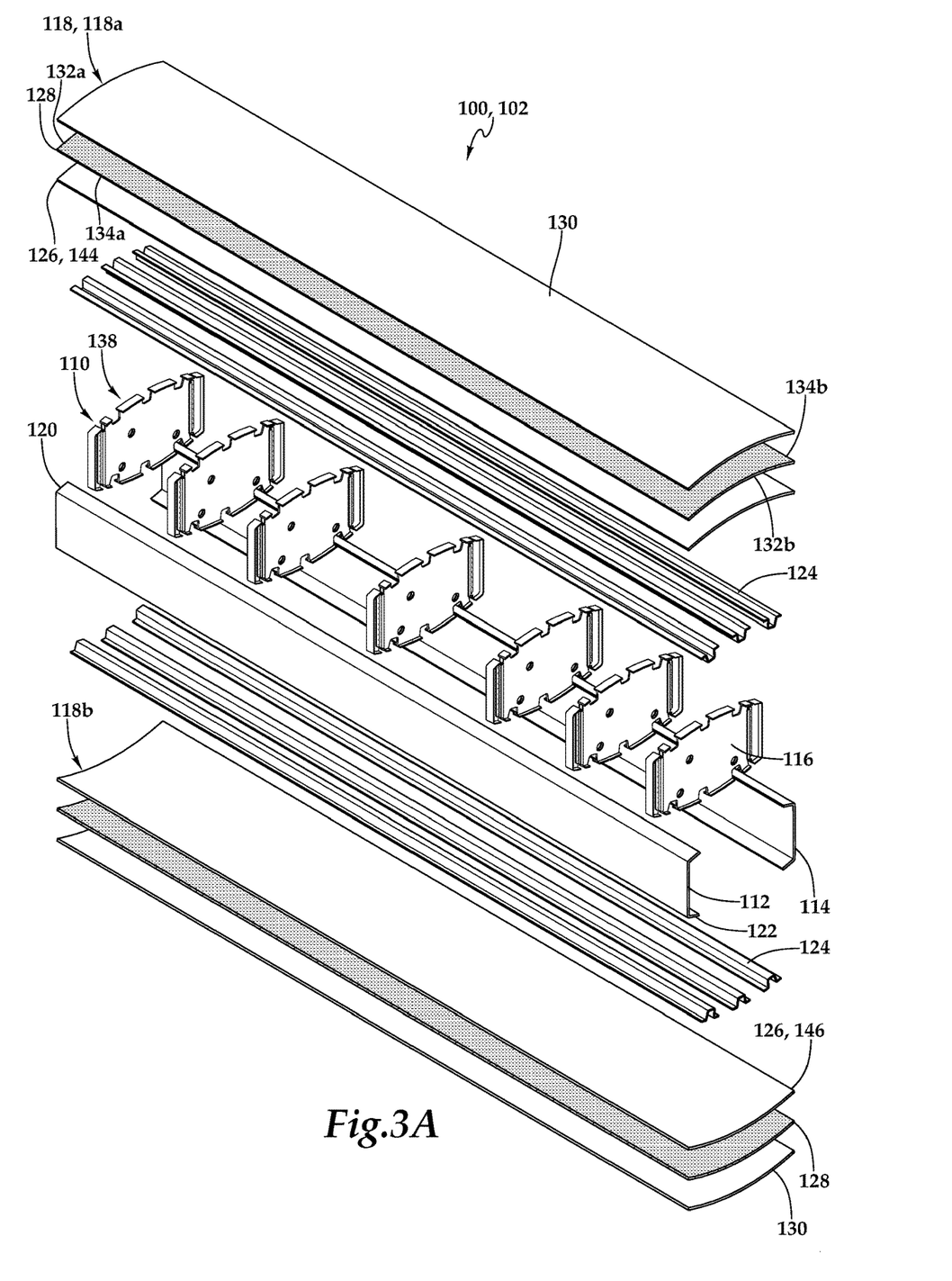
FIGS. 3A-3C are various views of a wing having a damping sublayer in accordance with embodiments of the present disclosure.
Figure 3B:
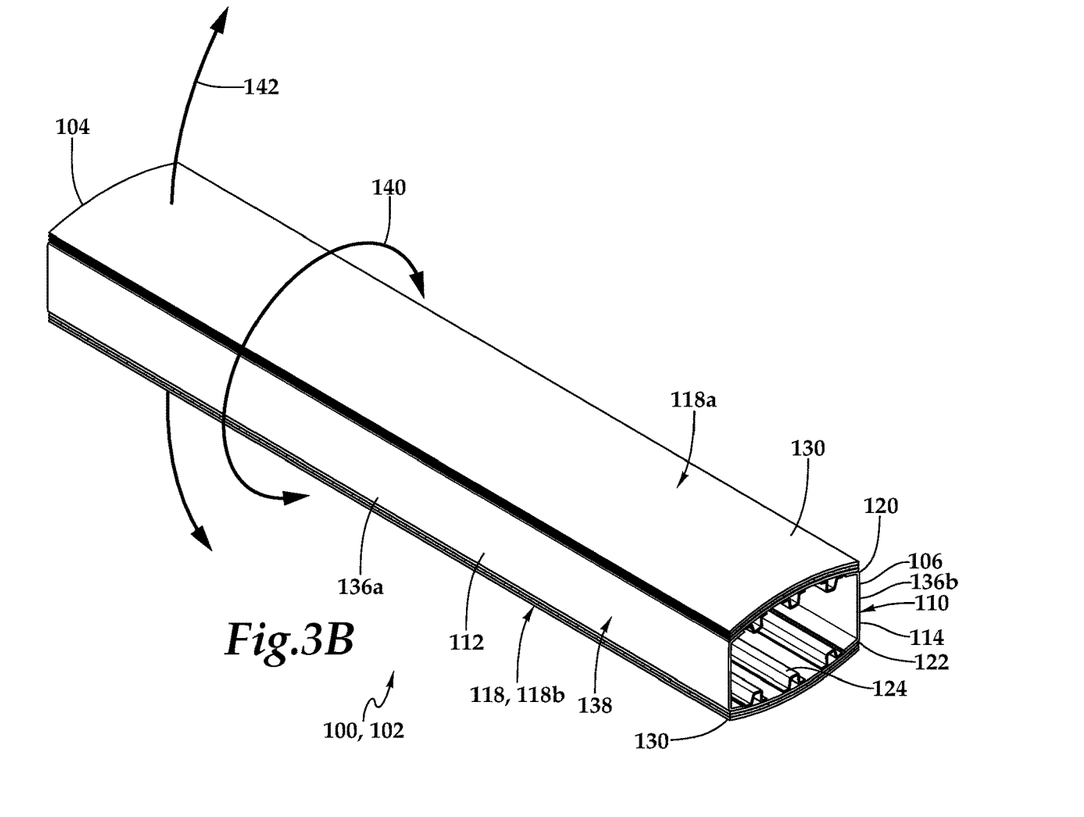
Figure 3C:
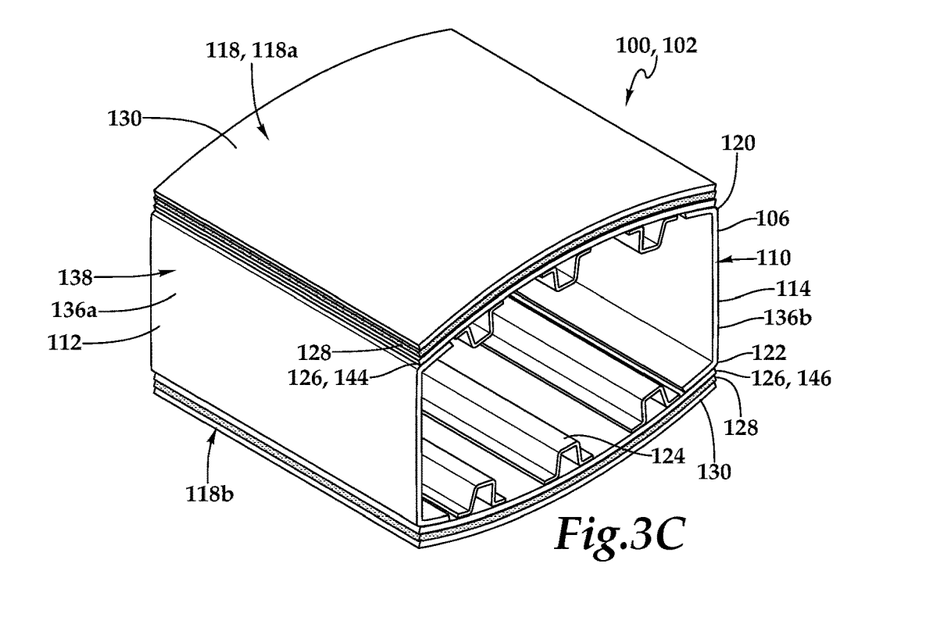

Wing airframe 100 includes a wing skin assembly 118, including top and bottom portions 118a, 118b, disposed on top and bottom sides 120, 122 of wing skin core assembly 110. Wing skin assembly 118 may be mounted onto wing airframe core assembly 110 using stringers 124. Wing skin assembly 118 includes an inner skin 126 disposed on top and bottom sides 120, 122 of wing airframe core assembly 110. Wing skin assembly 118 includes a damping sublayer 128 disposed on inner skin 126 such that inner skin 126 is interposed between damping sublayer 128 and wing airframe core assembly 110. Wing skin assembly 118 also includes outer skin 130 disposed on damping sublayer 128 such that damping sublayer 128 is sandwiched between inner and outer skins 126, 130. Damping sublayer 128 is also interposed between outer skin 130 and wing airframe core assembly 110. Damping sublayer 128 may be held into place between inner and outer skins 126, 130 using adhesive, fasteners, direct contact, pressure or other coupling techniques.

Inner skin 126, damping sublayer 128 and outer skin 130 may be approximately coextensive both spanwise and chordwise across wing airframe core assembly 110, and are substantially parallel to one another. Damping sublayer 128 extends spanwise across wing airframe core assembly 110 such that lateral ends 132*a*, 132*b* of damping sublayer 128 are adjacent to outboard ends, or lateral sides, 104, 106 of wing airframe core assembly 110, respectively. Damping sublayer 128 extends chordwise such that forward and aft ends 134*a*, 134*b* of damping sublayer 128 are adjacent to forward and aft sides 136*a*, 136*b* of wing airframe core assembly 110, respectively. While inner skin 126, damping sublayer 128 and outer skin 130 are illustrated as being coextensive and therefore having similar coverage areas, in other embodiments the areas of coverage of inner skin 126, damping sublayer 128 and outer skin 130 may each differ from one another. For example, while outer skin 130 may wrap around the top, bottom, forward and aft sides of wing 102, damping sublayer 128 may cover only the top and bottom sides of wing 102. In other example, instead of covering substantially all of top and bottom sides 120, 122 of wing airframe core assembly 110, damping sublayer 128 may cover only a portion of either or both sides 120, 122, such as 10%, 25%, 50%, 75%, 90% or any other coverage area, in which case damping sublayer 128 may not necessarily be coextensive with outer skin 130. Also, wing skin assembly portion 118*a* may differ from wing skin assembly portion 118*b*. For example, damping sublayer 128 may be included in only one of wing skin assembly portions 118*a* or 118*b* instead of being present in both portions 118*a*, 118*b*.

Damping sublayer 128 may be formed from a material that provides energy absorbing and damping capabilities. For example, damping sublayer 128 may be formed from an elastomeric material such as a rubber compound having a loss tangent greater than natural rubber. The rubber compound used to form damping sublayer 128 may have a loss tangent that is two to three times greater than the loss tangent of natural rubber. Forming the damping sublayer 128 from an elastomeric material with a high loss tangent provides damping sublayer 128 with greater energy absorbing capability. Damping sublayer 128 may also have any suitable thickness depending on the needs of the particular tiltrotor aircraft. For example, damping sublayer 128 may be thicker for tiltrotor aircraft having a higher forward airspeed so that the thicker damping sublayer 128 can provide additional energy absorbing capabilities to combat proprotor whirl flutter. While damping sublayer 128 is illustrated as extending along the top and bottom sides of wing airframe core assembly 110, damping sublayer 128 may extend along any portion of wing 102 and have any shape. For example, damping sublayer 128 may wrap around wing 102 such that damping sublayer 128 extends spanwise along the front, rear, top and bottom sides of wing 102. Damping sublayer 128 may also include multiple sections or strips that are contiguous, spaced, staggered or overlapping with one another to achieve advantageous damping characteristics.

Inner skin 126 and/or outer skin 130 may be formed from carbon-based materials such as graphite-based materials, including graphite, graphene-based materials or other carbon allotropes including carbon nanostructure-based materials such as materials including single-walled and multi-walled carbon nanotubes. Various structural components of wing airframe 100 such as inner and outer skins 126, 130, spars 112, 114, ribs 116, stringers 124 and the like may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system.

Wing 102 may integrate a torque box assembly 138, which is a closed geometric structure that supports the structural and flight loads, including torque loads 140 and bending loads 142, on wing 102 during flight. When torque box assembly 138 is twisted, the structure experiences sheer on all sides, which increases the stiffness of the structure for withstanding deflections, such as those stemming from the aeroelastic movement of propulsion assembly 108. Torque box assembly 138 includes wing airframe core assembly 110 and inner skin 126 disposed on top and bottom sides 120, 122 of wing airframe core assembly 110. Thus, inner skin 126 may act as the top and bottom sides 144, 146 of torque box assembly 138. The various components of torque box assembly 138 may be joined together by adhesive bonding or using aerospace fasteners such as pins, screws, rivets or other suitable fastening techniques to form torque box assembly 138.

Damping sublayer 128 is disposed on either or both of the top and bottom sides 144, 146 of torque box assembly 138. Outer skin 130 is disposed on damping sublayer 128. Damping sublayer 128 improves the strength of torque box assembly 138 including improved stiffness and torsional support during the shearing motion produced by the aeroelastic movement of the propulsion assemblies. Torque box assembly 138 has one or more load paths to transmit load, including torque and bending loads 140, 142, in response to deflection of wing 102. Damping sublayer 128 is disposed substantially parallel to one or more of the load paths transmitted by torque box assembly 138 to support or dampen the load along such path(s). Damping sublayer 128 may thus be considered to be a parasitic structure in some embodiments.

As discussed herein, the propulsion assemblies include pylon assemblies that are subject to aeroelastic movement during forward flight. Aeroelastic movement may include movement relative to wing 102 caused by aeroelastic phenomena during forward flight. Aeroelastic movement of the pylon assemblies may include proprotor whirl flutter. In response to the aeroelastic movement of the pylon assemblies, wing 102 may deflect, which includes movement, vibration, oscillation or fluttering out of the stable plane formed by wing 102, including a motion component along a substantially vertical plane. For example, deflection of wing 102 may include torque movement 140 and/or bending movement 142. In addition, wing 102 may have a natural frequency and may vibrate at its natural frequency in response to aeroelastic movement of the pylon assemblies. For any given airspeed, wing 102 has a stiffness requirement to maintain stability due to aeroelastic phenomena. As airspeed increases, the load on wing 102 increases more than linearly, which necessitates greater measures be taken to reduce wing deflection as airspeed increases. Damping sublayer 128 and the damping structures disclosed herein provide damping to torsional and bending modes 140, 142 of wing 102. Damping sublayer 128 reduces the deflection of wing 102 caused by aeroelastic movement of the pylon assemblies, thereby stabilizing wing 102 during forward flight. Damping sublayer 128 experiences a shear force, which may be caused by the movement of outer skin 130, in response to the deflection of wing 102.

Figure 4:
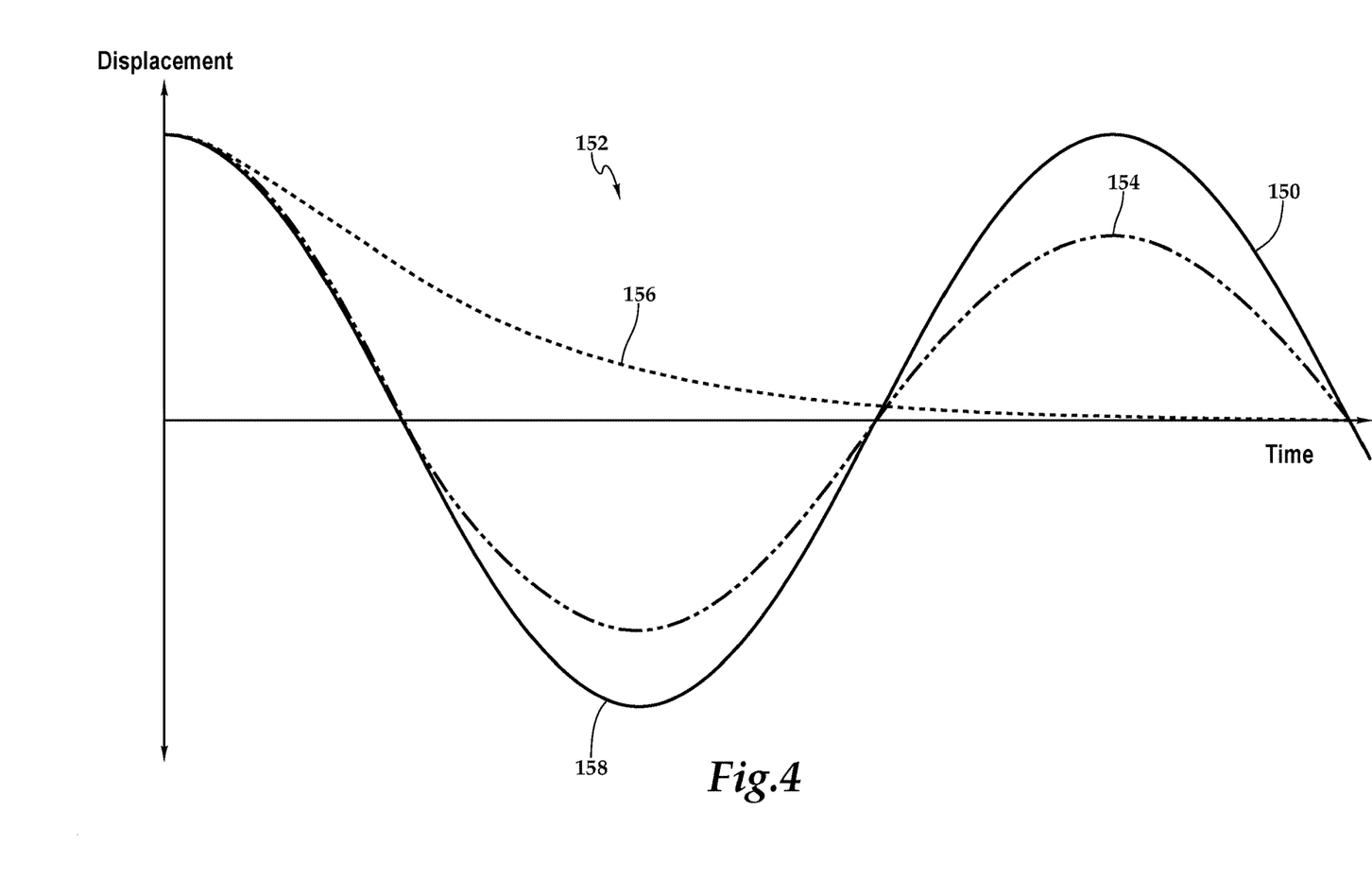
FIG. 4 is a graph illustrating the damped and undamped displacement over time of a deflected wing in accordance with embodiments of the present disclosure.

Referring specifically to FIG. 4, the undamped vibration of wing 102 caused by, for example, the aeroelastic movement of a pylon assembly, is represented by undamped curve 150 in displacement versus time graph 152. Damping sublayer 128 may dampen the deflection of wing 102 by various degrees, as illustrated by lightly damped curve 154 and heavily damped curve 156. The thickness of damping sublayer 128 is one factor affecting the amount by which the vibration of wing 102 is damped. Undamped vibration 150 of wing 102 has a displacement amplitude 158 that is reduced by the energy absorbing capabilities of damping sublayer 128. While damping sublayer 128 may not change the natural frequency of wing 102, as shown in FIG. 4, damping sublayer 128 may decrease the vibratory response of wing 102 when wing 102 is deflected due to aeroelastic movements. Damping sublayer 128 and the other damping structures disclosed herein are passive, lightweight, highly reliable and allow for greater airspeed for a tiltrotor aircraft so that the tiltrotor aircraft can achieve a higher Velocity Never Exceed (VNE) before experiencing structural instability. The illustrative embodiments increase the margin, or buffer, for allowable airspeed before wing 102 begins to experience structural instability, reducing the likelihood of a human or other error causing a crash. The illustrative embodiments also reduce the likelihood of overloading wing 102, which can lead to structural wing failure.

Figure 5:
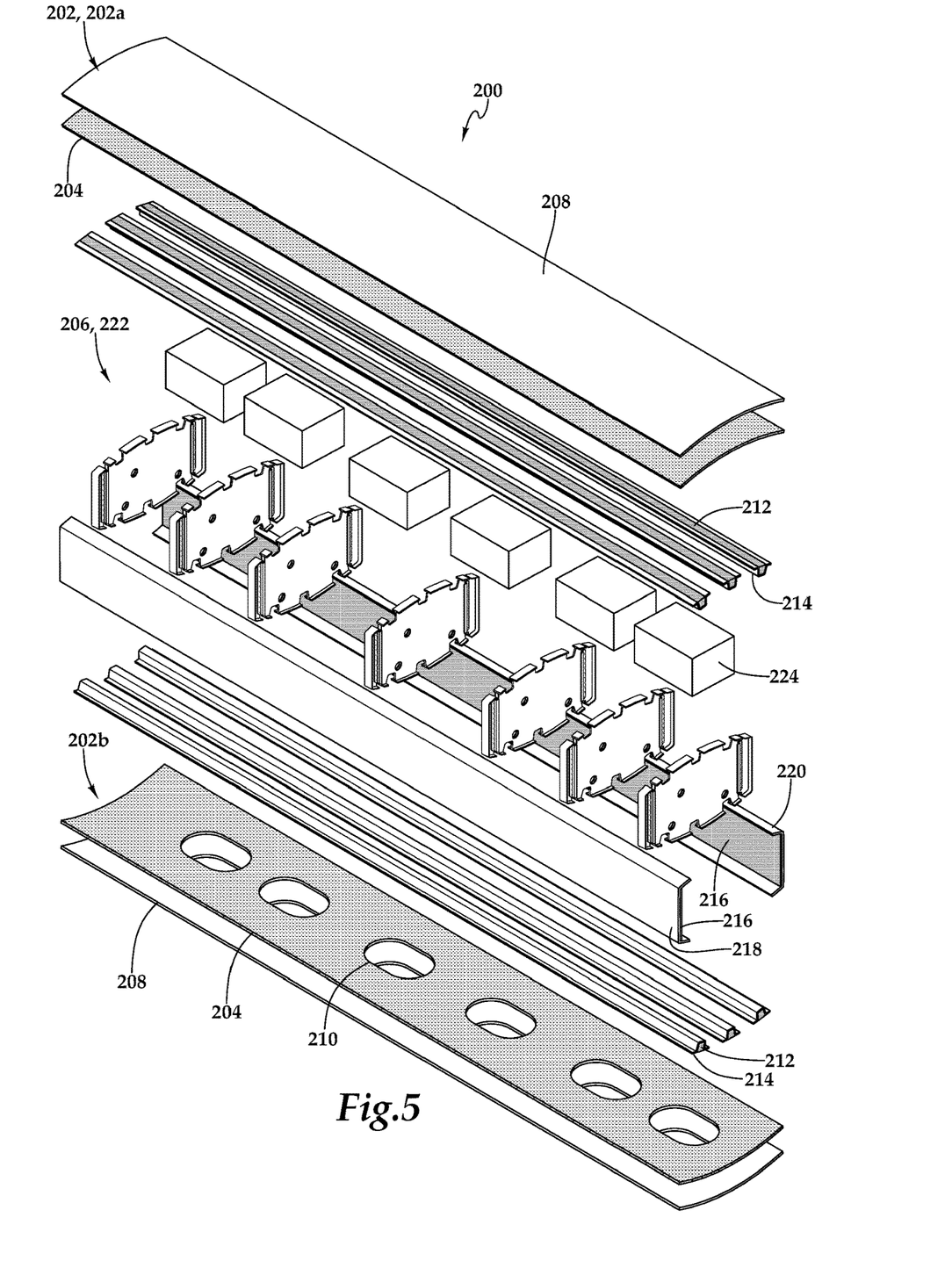
FIG. 5 is an exploded view of a wing having damping structures in accordance with embodiments of the present disclosure.

Referring to FIG. 5 in the drawings, a wing of a tiltrotor aircraft is schematically illustrated and generally designated 200. In the illustrated embodiment, top and bottom portions 202a, 202b of wing skin assembly 202 do not include an inner skin. Thus, damping sublayer 204 may be disposed directly onto wing airframe core assembly 206. Excluding the inner skin may lighten wing 200 while still providing a torque box structure that is closed on its top and bottom sides by wing skin assembly 202. Wing skin assembly 202 includes outer skin 208. Outer skin 208 and damping sublayer 204 are approximately coextensive and substantially parallel to one another. Bottom portion 202b of wing skin assembly 202 includes one or more access holes 210 to provide access to the inside of wing 200. Access holes 210 may be fuel access holes. Access holes 210 may be formed in the bottom portions of both damping sublayer 204 and outer skin 208. Wing 200 has additional damping structures inside the load path structure, including damping beams 212 that are formed within or along stringers 214 and damping beams 216 that face the inside of wing 200 and extend along forward and aft spars 218, 220. Other damping beams or structures located within or parallel to the load path structure of wing airframe 222 may also be included in wing 200. Such additional damping structures may be beams, walls, layers, struts, barriers or any other members to provide energy absorbing or damping capabilities for wing 200.

Fuel cells 224 may include baffles (not shown) or other inner structure to exploit the controlled motion of fuel therein as a damping mechanism to combat aeroelastic phenomena. Such baffles may prevent sloshing and low frequency shutter of the fuel in fuel bags 224. For example, proprotor whirl flutter may push the fuel in fuel bags 224 through the baffles, which act as a damped orifice. In this way, the mere presence of the fuel acts as a parasitic damper for wing 200. The baffles may have different orientations to have peak damping at certain frequencies and to combat pitching and fore/aft shear. Fuel cells 224 may also include volumetric dampers, in which fuel cells 224 include one or more internal movable walls. The movable wall may include a spring, such as an air spring, such that the wall moves in response to the movement or oscillation of the fuel. The volumetric damper may be used to control the sloshing frequency of the fuel and therefore damp deflections of wing 200. In other embodiments, wing 200 may also include active vibration systems to help dampen deflections of wing 200.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wing airframe for a wing of a tiltrotor aircraft, the tiltrotor aircraft including a pylon assembly subject to aeroelastic movement during forward flight, comprising:
   a wing airframe core assembly; and
   a wing skin assembly disposed on the wing airframe core assembly, the wing skin assembly including an outer skin and a damping sublayer, the damping sublayer interposed between the outer skin and the wing airframe core assembly;
   wherein the wing skin assembly further comprises an inner skin interposed between the damping sublayer and the wing airframe core assembly such that the damping sublayer is sandwiched between the inner and outer skins;
   wherein the damping sublayer, the outer skin and the inner skin have coextensive forward and aft edges to provide substantially equal coverage areas;
   wherein the damping sublayer further comprises an elastomeric material;
   wherein the damping sublayer has a substantially uniform chordwise and spanwise rigidity and density;
   wherein the wing airframe core assembly has a top side and a bottom side, the wing skin assembly disposed on the top and bottom sides of the wing airframe core assembly to form top and bottom portions of the wing skin assembly;
   wherein the damping sublayer of the bottom portion of the wing skin assembly is monolithic;
   wherein the wing skin assembly includes one or more access holes formed at least through the monolithic and elastomeric damping sublayer of the bottom portion of the wing skin assembly;
   wherein the wing is subject to deflection in response to the aeroelastic movement of the pylon assembly; and
   wherein the damping sublayer reduces the deflection of the wing, thereby stabilizing the wing during forward flight.

2. The wing airframe as recited in claim 1 wherein the inner skin, the outer skin and the damping sublayer are approximately coextensive and substantially parallel to one another.

3. The wing airframe as recited in claim 1 wherein the inner skin, the damping sublayer and the outer skin are substantially coextensive spanwise.

4. The wing airframe as recited in claim 1 wherein the elastomeric material further comprises a rubber compound having a loss tangent greater than natural rubber.

5. The wing airframe as recited in claim 1 wherein the wing has a displacement amplitude in response to the deflection, the damping sublayer damping the deflection of the wing such that the displacement amplitude is reduced.

6. The wing airframe as recited in claim 1 wherein the deflection of the wing further comprises at least one of bending or torque movement.

7. The wing airframe as recited in claim 1 wherein the wing has a natural frequency and wherein the deflection of the wing further comprises vibration at approximately the natural frequency in response to the aeroelastic movement of the pylon assembly.

8. The wing airframe as recited in claim 1 wherein the deflection of the wing further comprises flutter.

9. The wing airframe as recited in claim 1 wherein the wing airframe core assembly further comprises at least one spar and a plurality of ribs.

10. The wing airframe as recited in claim 9 further comprising one or more damping beams extending along the at least one spar.

11. The wing airframe as recited in claim 1 wherein the inner skin, the outer skin and the damping sublayer are substantially coextensive chordwise.

12. The wing airframe as recited in claim 1 further comprising:
a plurality of stringers configured to mount the wing skin assembly to the wing airframe core assembly; and
a plurality of damping beams formed along the stringers.

13. The wing airframe as recited in claim 1 further comprising a plurality of fuel cells each including a baffle disposed in the wing airframe core assembly.

14. A tiltrotor aircraft having a forward flight mode, the tiltrotor aircraft comprising:
a fuselage;
a wing coupled to the fuselage, the wing including a torque box assembly having top and bottom sides and a wing skin assembly disposed on the top and bottom sides of the torque box assembly to form top and bottom portions of the wing skin assembly, the wing skin assembly including an outer skin and a damping sublayer, the damping sublayer interposed between the outer skin and the torque box; and
at least one propulsion assembly coupled to the wing, each propulsion assembly including a pylon assembly subject to aeroelastic movement during forward flight;
wherein the wing skin assembly further comprises an inner skin interposed between the damping sublayer and the torque box such that the damping sublayer is sandwiched between the inner and outer skins;
wherein the damping sublayer, the outer skin and the inner skin have coextensive forward and aft edges to provide substantially equal coverage areas;
wherein the damping sublayer further comprises an elastomeric material;
wherein the damping sublayer has a substantially uniform chordwise and spanwise rigidity and density;
wherein the damping sublayer of the bottom portion of the wing skin assembly is monolithic;
wherein the wing skin assembly includes one or more access holes formed at least through the monolithic and elastomeric damping sublayer of the bottom portion of the wing skin assembly;
wherein the wing is subject to deflection in response to the aeroelastic movement of the pylon assembly; and
wherein the damping sublayer reduces the deflection of the wing, thereby stabilizing the wing during forward flight.

15. The tiltrotor aircraft as recited in claim 14 wherein the torque box assembly further comprises a wing airframe core assembly having top and bottom sides, the inner skin disposed on the top and bottom sides of the wing airframe core assembly.

16. The tiltrotor aircraft as recited in claim 14 wherein the wing further comprises first and second outboard ends respectively having first and second propulsion assemblies coupled thereto and wherein the wing is subject to deflection in response to the aeroelastic movements of the pylon assemblies of the first and second propulsion assemblies.

17. The tiltrotor aircraft as recited in claim 14 wherein the torque box assembly has one or more load paths to transmit load in response to the deflection of the wing.

18. The tiltrotor aircraft as recited in claim 17 wherein the damping sublayer is disposed substantially parallel to at least one of the load paths of the torque box assembly.

* * * * *